United States Patent
Liu et al.

(10) Patent No.: US 9,396,264 B2
(45) Date of Patent: Jul. 19, 2016

(54) METHODS AND SYSTEMS FOR INFORMATION MATCHING

(71) Applicant: TENCENT TECHNOLOGY (SHENZHEN) COMPANY LIMITED, Shenzhen (CN)

(72) Inventors: Yelu Liu, Shenzhen (CN); Changlin LI, Shenzhen (CN); Yu Peng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 155 days.

(21) Appl. No.: 14/311,764

(22) Filed: Jun. 23, 2014

(65) Prior Publication Data

US 2014/0372403 A1 Dec. 18, 2014

Related U.S. Application Data

(63) Continuation of application No. PCT/CN2014/072258, filed on Feb. 19, 2014.

(30) Foreign Application Priority Data

Jun. 13, 2013 (CN) .......................... 2013 1 0233728

(51) Int. Cl.
  *G06F 17/30* (2006.01)
  *G06F 7/00* (2006.01)
  *H04L 12/58* (2006.01)
(52) U.S. Cl.
  CPC ........ *G06F 17/30864* (2013.01); *H04L 51/046* (2013.01)
(58) Field of Classification Search
  CPC .............. G06Q 30/02; G06F 17/30386; G06F 17/30864; G06F 17/30893
  USPC ......................................................... 707/706
  See application file for complete search history.

(56) References Cited

U.S. PATENT DOCUMENTS

| | | | |
|---|---|---|---|
| 2006/0136298 A1* | 6/2006 | Klein | G06Q 30/02 705/14.54 |
| 2009/0254618 A1 | 10/2009 | Arnold et al. | |
| 2011/0202594 A1* | 8/2011 | Ricci | H04M 3/4931 709/203 |
| 2013/0152158 A1* | 6/2013 | Yoshihama | G06F 21/6245 726/1 |
| 2013/0215116 A1* | 8/2013 | Siddique | G06Q 30/0643 345/420 |

FOREIGN PATENT DOCUMENTS

| | | |
|---|---|---|
| CN | 101360071 A | 2/2009 |
| CN | 102891874 A | 1/2013 |

OTHER PUBLICATIONS

The World Intellectual Property Organization (WIPO) International Search Report for PCT/CN2014/072258 May 20, 2014.

* cited by examiner

*Primary Examiner* — Kuen Lu
(74) *Attorney, Agent, or Firm* — Anova Law Group, PLLC

(57) ABSTRACT

A method and system for information matching in an instant messaging user interface are disclosed. The method includes monitoring, in real time, chat records in an instant messaging interface to identify a keyword and starting a search application interface if the keyword is identified. The method further includes obtaining key information associated with keyword through the search application interface, and presenting the key information in the instant messaging interface. The method and system consistent with the present disclosure may enrich the user experience in instant messaging applications.

18 Claims, 11 Drawing Sheets

METHODS AND SYSTEMS FOR INFORMATION MATCHING

CROSS-REFERENCES TO RELATED APPLICATIONS

Related Applications

This application is a continuation application of PCT Patent Application No. PCT/CN2014/072258, filed on Feb. 19, 2014, which is based upon and claims the benefit of priority from Chinese Patent Application No. 201310233728.4, filed on Jun. 13, 2013, the entire contents of which are incorporated herein by reference.

FIELD OF THE INVENTION

The present disclosure relates to Internet technologies and, more particularly, to methods and systems for information matching.

BACKGROUND

When users chat via instant messaging applications, the chats often involve names of places, specific terms, and other keywords. If a user desires to obtain more information about certain keywords, he may need to manually start a search engine application to search for the keywords to obtain information associated with the keywords. For example, a user may receive a name of a place: "xi si." If the user would like to find out the driving directions to "xi si," he may need to start a map application. The user may enter a starting point and then enter "xi si" as the end point, and find the driving directions to "xi si." In another example, a user may receive from a friend a technical term, such as "wireless network controller." The user may start a browser application, and then enter the keyword "wireless network controller" to search for the definitions and other related information for the term.

The above search examples involve processes for information matching. However, users often need to manually switch from an instant messaging interface to a search interface and then enter keywords to obtain the relevant images or text data. This kind of manual operations are so tedious that the users may be reluctant to start the information matching (i.e., searching) process. In addition, manually starting a search engine and switching back and forth between the instant messaging software and the search engine may interrupt the online chat experience, causing inconveniences to the users.

The disclosed method and system are directed to solve one or more problems set forth above and other problems.

BRIEF SUMMARY OF THE DISCLOSURE

Embodiments consistent with the present disclosure provide a method, system, mobile device, or a server for matching information for an instant messaging interface. Embodiments consistent with the present disclosure present relevant information to instant message users seamlessly.

One aspect of the present disclosure provides a method for information matching in an instant messaging user interface. The method includes monitoring, in real time, chat records in an instant messaging interface to identify a keyword and starting a search application interface if the keyword is identified. The method further includes obtaining key information associated with the keyword through the search application interface, and presenting the key information in the instant messaging interface.

Another aspect of the present disclosure provides a system for information matching in an instant messaging user interface. The system includes a monitoring unit configured to monitor, in real time, chat records in an instant messaging interface to identify a keyword; and a retrieval unit configured to start a search application interface if the keyword is identified. The system further includes an obtaining unit configured to obtain key information associated with the keyword through the search application interface; and a display unit configure to present the key information in the instant messaging interface.

Embodiments consistent with the present disclosure provide a method for information matching. An information matching system consistent with the present disclosure may monitor an instant messaging session in real time. If the system determines that the instant messaging session includes one or more keywords, it may start a search application interface and obtain key information from the interface. The system may further load the key information into the instant messaging user interface to present to the user. An information matching system consistent with the present disclosure may engage a search engine to search the keyword automatically. The system may further load the information relevant to the keyword into the instant messaging user interface to present to the user. Embodiments consistent with the present disclosure may thus reduce the manual exchanges between the instant messaging application and the search application and reduce other user manual operations without affecting the instant messaging session.

Other aspects of the present disclosure can be understood by those skilled in the art in light of the description, the claims, and the drawings of the present disclosure.

BRIEF DESCRIPTION OF THE DRAWINGS

To illustrate embodiments of the invention, the following are a few drawings illustrating embodiments consistent with the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

In the present disclosure, an information matching process may include any process that matches two or more pieces of information. For example, when conducting a search, a search engine may match a search term with contents on webpages being searched. The information matching process may also match information across different data formats, such as text data, audio data, etc. For example, a search engine may match an object's name with its image.

Figure 11:
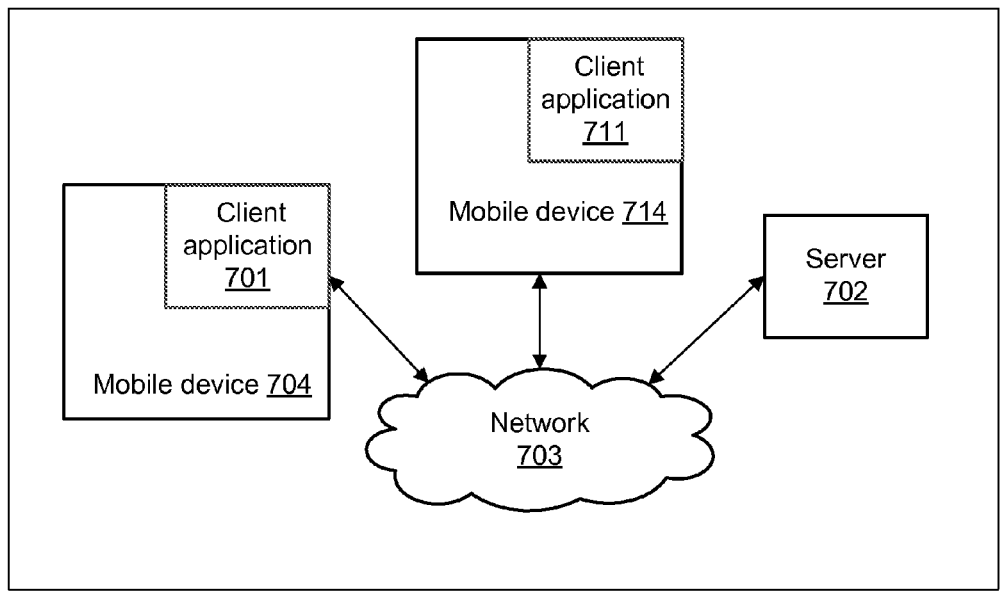
FIG. 11 illustrates an exemplary operating environment incorporating certain disclosed embodiments.

FIG. 11 illustrates an exemplary online computer environment 700 incorporating certain disclosed embodiments. As shown in FIG. 11, environment 700 may include mobile devices 704 and 714, a network 703, and a server 702. The network 703 may include any appropriate type of communication network for providing network connections to the mobile devices 704 and 714, and the server 702. For example, network 703 may include the Internet, LAN (Local Area Network), or other types of computer networks or telecommunication networks, either wired or wireless.

A server 702, as used herein, may refer to one or more server computers configured to provide certain functionalities, which may require any user accessing the services to authenticate to the server before the access. The server 702 may also include one or more processors to execute computer programs in parallel. The server 702 may include any appropriate server computers configured to provide certain server functionalities, such as storing or processing data related to online searches. Although only one server is shown, any number of servers can be included. The server 702 may operate in a cloud or non-cloud computing environment.

Mobile devices 704 and 714 may include any appropriate type of network computing devices, such as PCs, tablet computers, smartphones, network TVs, etc. Mobile devices 704 and 714 may include one or more client applications 701 and 711. The client applications 701 and 711, as used herein, may include any appropriate software application, hardware application, or a combination thereof to achieve certain client functionalities, such as conducting a search online or hosting a chat session online. For example, client applications 701 and 711 may be the Internet Explorer application, which may access various search engines and map applications online. Any number of client applications 701 and 711 may be included in the environment 700.

Figure 12:
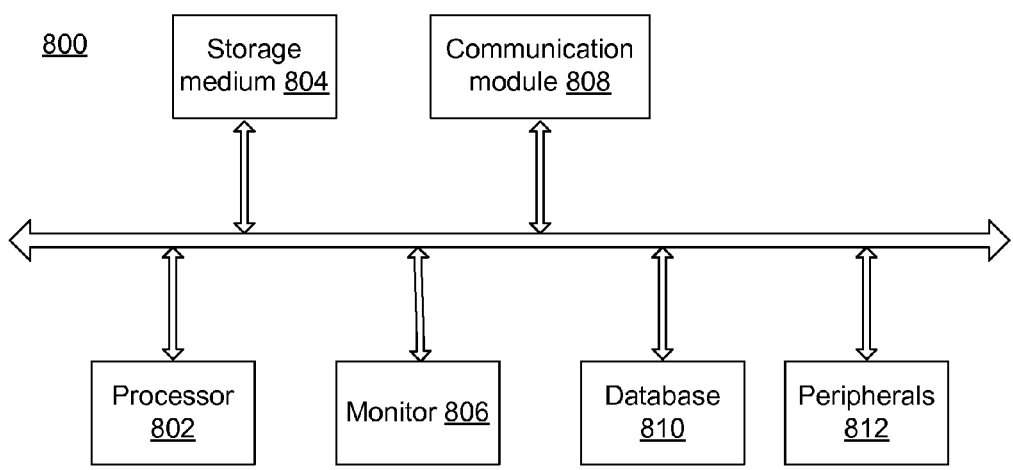
FIG. 12 illustrates a block diagram of an exemplary computer system consistent with the disclosed embodiments.

Mobile devices 704/714 and server 702 may be implemented on any appropriate computing platform. FIG. 12 illustrates a block diagram of an exemplary computer system 800 capable of implementing mobile devices 704/714 and server 702.

As shown in FIG. 12, computer system 800 may include a processor 802, storage medium 804, a monitor 806, a communication module 808, a database 810, and peripherals 812. Certain devices may be omitted and other devices may be included.

Processor 802 may include any appropriate processor or processors. Further, processor 802 can include multiple cores for multi-thread or parallel processing. Storage medium 804 may include memory modules, such as Read-only Memory (ROM), Random Access Memory (RAM), flash memory modules, and erasable and rewritable memory, and mass storages, such as CD-ROM, U-disk, and hard disk, etc. Storage medium 804 may store computer programs for implementing various processes, when executed by processor 802.

Further, peripherals 812 may include I/O devices such as a keyboard and a mouse. Communication module 808 may include network devices for establishing connections through the communication network 703. Database 810 may include one or more databases for storing certain data and for performing certain operations on the stored data, such as database searching.

In operation, the server 702 may obtain and process data related to online searches on user interfaces of mobile devices 704/714. For example, the server 702 may use processor 802 to check whether the content on a webpage contains certain keywords. If so, the processor 802 may present a link to the webpage on mobile devices 704/714 or display the search result in a different format in the user interface.

Figure 1:
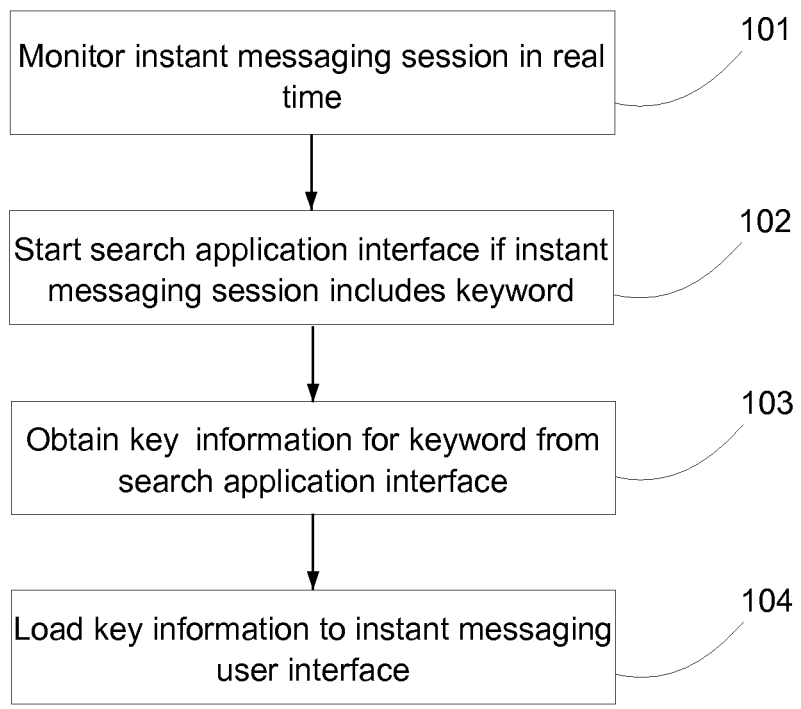
FIG. 1 is a flowchart of a method for information matching implemented by an exemplary embodiment consistent with the present disclosure.

FIG. 1 shows a flow chart of a method for information matching implemented by embodiments consistent with the present disclosure. The method shown in FIG. 1 includes steps 101-104. In step 101, a system for information matching may monitor an instant messaging session in real time. When a user uses an instant messaging application to chat with a friend, the system may monitor the record of the conversation in real time. The system may check whether the record of the conversation includes a keyword. The keyword may be specified by the system. The keyword includes, but is not limited to, a name of a place, a name of a person, a technical term, etc.

In step 102, if the system for information matching determines that the records of the instant messaging session includes the keyword, it may start a search application interface. After the system for information matching determines that the records of the instant messaging session includes the keyword, it may start a search application interface at the back end. The system may keep the front end unchanged to enable the users to continue the instant messaging session.

In step 103, the system may obtain key information about the keyword from the search application interface. The system may obtain key information such as a street view picture, or a definition of a technical term related to the keyword. In this embodiment, the key information may include text information, image information, audio information, etc.

In step 104, the system may load the key information into the instant messaging user interface. After the system obtains the key information about the keyword, it may load the information to the front end instant message application. The system may present the key information to the user. For example, after obtaining a street view picture of Tiananmen Square, the system may initiate a display interface on the right side of an instant messaging user interface. The system may then display the street view picture of Tiananmen Square in the display interface.

In many instant message applications, when one user receives a name of a place, he may need to exit the instant message interface, and then start a search engine to look up the street view of the place. The user may enter the name of the place into a search application interface to obtain maps or street view pictures related to the place. This kind of manual operations may be so tedious that the users may be reluctant to start the information matching (i.e., searching) process. In addition, manually starting a search engine and switching back and forth between the instant messaging software and the search engine may interrupt the online chat experience, causing inconveniences to the users.

Embodiments consistent with the present disclosure provide a method for information matching. An information matching system consistent with the present disclosure may monitor an instant messaging session in real time. If the system determines that the instant messaging session includes one or more keywords, it may start a search application interface and obtain key information from the interface. The system may further load the key information into the instant messaging user interface to present to the user. An information matching system consistent with the present disclosure may engage a search engine to search the keyword automatically. The system may further load the information relevant to the keyword into the instant messaging user interface to present to the user. Embodiments consistent with the present disclosure may thus reduce the manual exchanges between the instant messaging application and the search application and reduce other user manual operations without affecting the instant messaging session.

Figure 2:
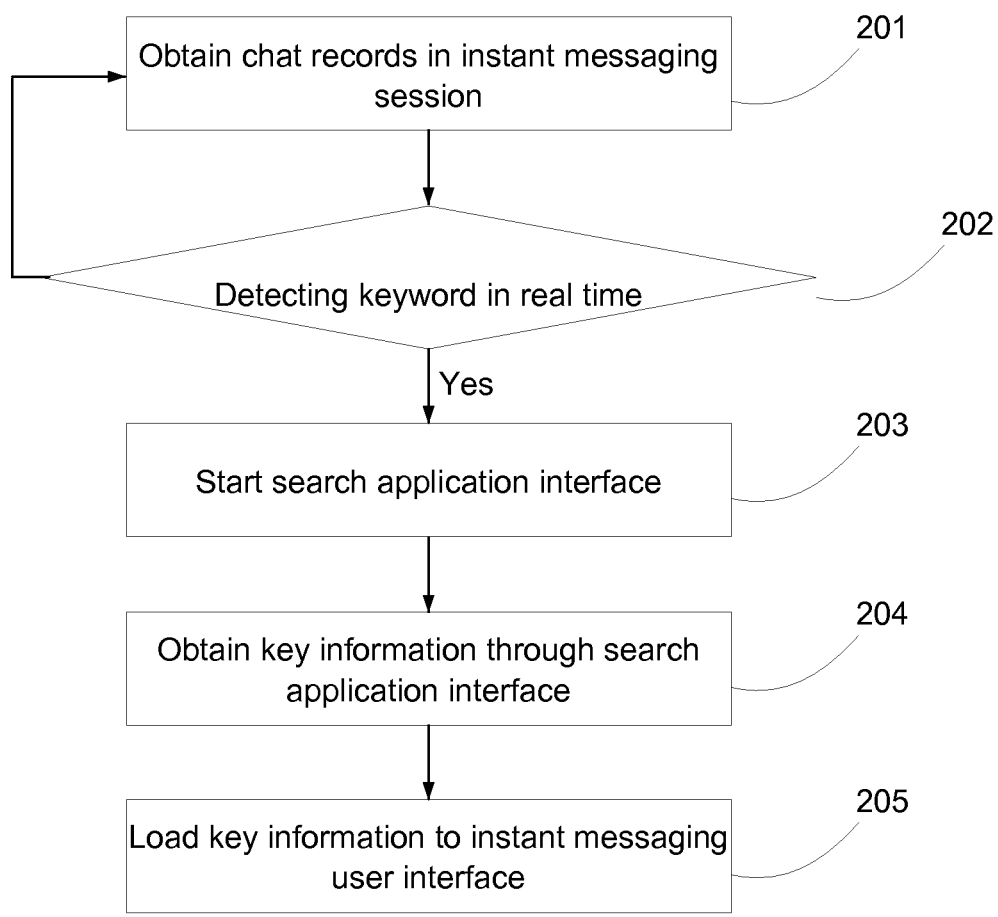
FIG. 2 is another flowchart of a method for information matching implemented by an exemplary embodiment consistent with the present disclosure.

FIG. 2 shows another flow chart of an exemplary method for information matching implemented by embodiments consistent with the present disclosure. The method shown in FIG. 2 includes steps 201-205. In step 201, a system for information matching may obtain the record of chats in an instant messaging application. The system may match keywords with other data during a chat session. Once a user enters a line of chat (or a sentence), the system may record the chat record and execute step 202. Alternatively, the system may match keywords with other data periodically. For example, the system may check whether the chat record contains a certain keyword every 20 seconds. The system may then execute step 202. In this example, the system may record each line of chat once the line of chat is entered by a user.

In step 202, the system may monitor the chat record in real time. The system may locally store or retrieve from a network server a default keyword database. The default keyword database may include one or more keywords. The system may check the chat records of the instant messaging session. If the records of the chat session include one or more keywords in the keyword database, the system may then execute step 203.

In this embodiment, monitoring the chat records of an instant messaging session may refer to the scenarios in which the system records and monitors a line of chat once the line of chat record is created (e.g., by a user entering texts and another responding with more texts). The system may match the text in the chat records to the keyword in the default keyword database. The matching process may include the following steps.

In step 202a, once a new chat record is generated, the system for information matching may traverse the text in the record. The system may apply semantic analysis to parse the chat record into multiple words. In step 202b, the system may determine whether the text in the chat record contains certain keywords. The system may compare the parsed out words with the keywords in the keyword database. If a parsed out word matches one of the keywords in the keyword database, the system may execute step 203. If not, the system may repeat step 201.

Figure 3:
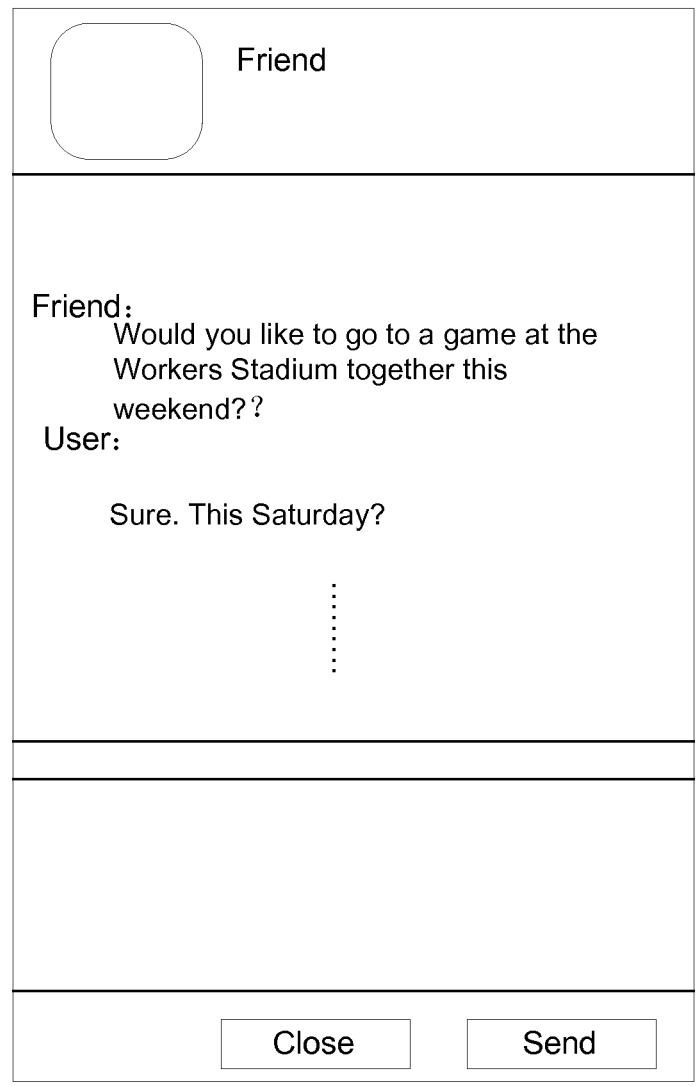
FIG. 3 is an exemplary instant messaging user interface implemented by an embodiment consistent with the present disclosure.

For example, two users' instant messaging session is shown in FIG. 3. In this example, the system for information matching may obtain the chat record "Would you like to go to a game at the Workers Stadium together this weekend?" from the instant messaging session. The system may traverse the chat record and parse out the word "the Workers Stadium." The system may compare the word "the Workers Stadium" to the words in the keyword database. Once the system determines that the word "the Workers Stadium" is in the keyword database, it may designate the word as a keyword. Next, the system may obtain chat record "Sure. This Saturday?" and apply semantic analysis to the record. The system may parse out the word "Saturday" and compare the word with the words in the keyword database. The system may determine that "Saturday" is not listed in the keyword database, and therefore is not a keyword. The system may then repeat step 201 to obtain the next chat record.

Figure 4:
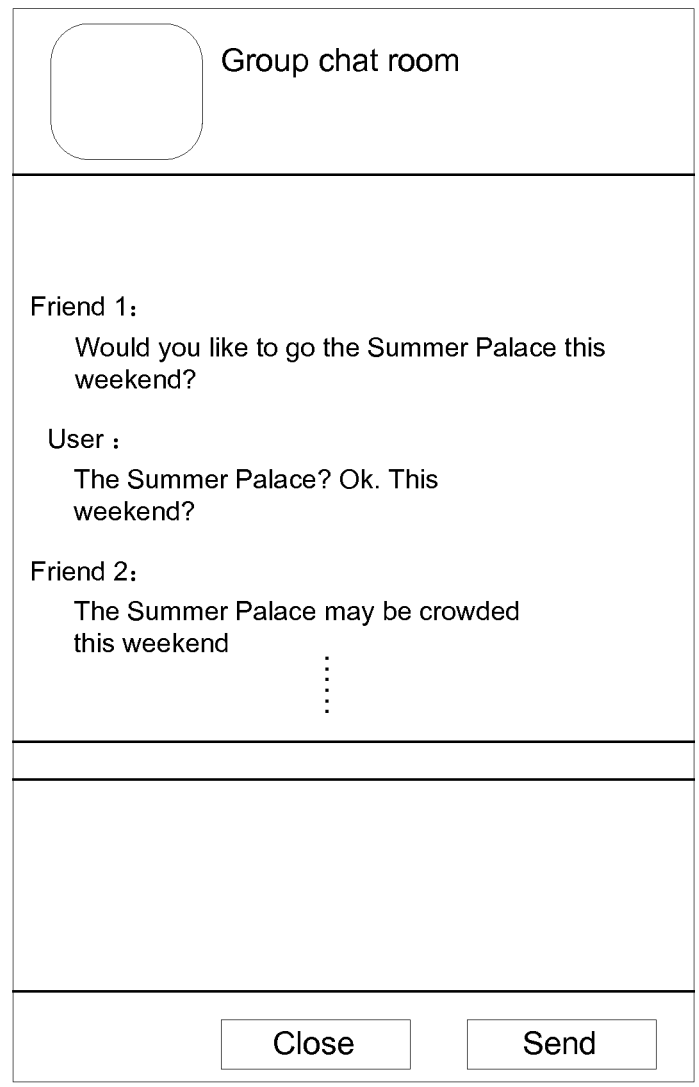
FIG. 4 is another exemplary instant messaging user interface implemented by an embodiment consistent with the present disclosure.

In step 203, the system for information matching may determine that the chat records include a keyword. The system may start a search application interface. In addition, in certain instances, certain keywords may incidentally appear in the record of a chat session. However, these keywords may not be what the users desire to learn more about. To avoid negative impacts to the instant messaging session, the system for information matching may set a threshold and only search for information for keywords that appeared more times than the threshold value. In one embodiment, the system may count the number of appearance of a keyword. If the number of appearance reaches a pre-set number, then the system may execute step 203 to start a search application interface. For example, the pre-set number may be 3. As shown in the FIG. 4, the first chat record is "Would you like to go the Summer Palace this weekend?" The system may parse out the word "the Summer Palace" and set the counter for appearance at 1. The system may then determine that 1 appearance is less than the threshold value of 3 and repeat step 201. The system may obtain the next chat record "The Summer Palace? Ok. This weekend?" from the instant messaging session. The system may again parse out the word "the Summer Palace." and set the counter to 2. The system may then determine that 2 appearances are less than the threshold value of 3 and repeat step 201. The system may obtain the next chat record "Summer Palace may be crowded this weekend" from the instant messaging session. The system may again parse out the word "the Summer Palace." and set the counter to 3. As the keyword appearances have reached the threshold (3), the system for information match may then execute 203 to match "the Summer Palace" with certain key information. The system may also reset the counter for "the Summer Palace."

In this embodiment, the system may set a default time to check the number of appearance of a keyword. For example, the system may count the number of appearance in a 30 minute cycle. If the number of appearance of a keyword reaches a preset threshold, then the system may execute step 203. If not, the system may reset the appearance counter and check the keywords again in the next cycle.

In another example, the system may count the number of appearances in a complete chat session. For example, two users may generate 230 chat records. The system may parse the 230 records. If the number of appearance of a keyword reaches a preset threshold, then the system may execute step 203. If not, the system may reset the appearance counter and check the keywords again in the next instant messaging session. It is apparent that the numbers used in the examples in the present disclosure are exemplary only and do not limit the scope of the present disclosure.

Figure 5:
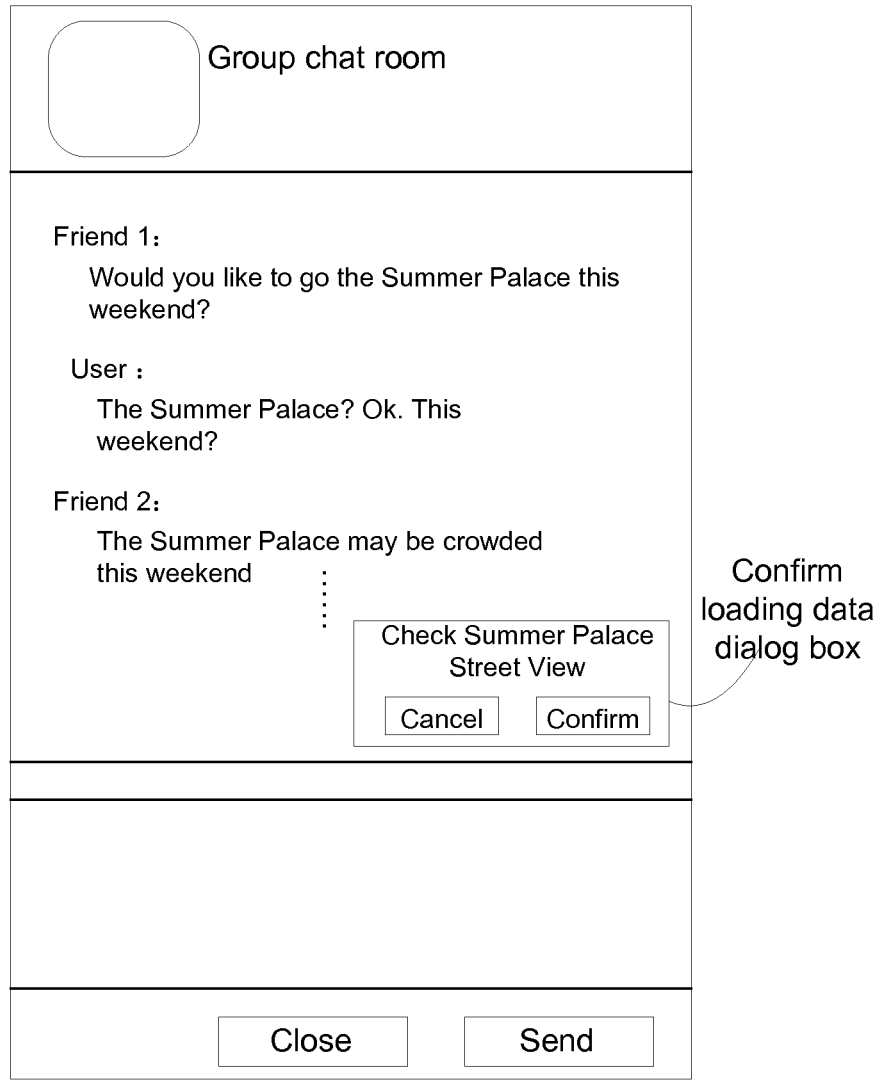
FIG. 5 is another exemplary instant messaging user interface implemented by an embodiment consistent with the present disclosure.

Further, in another example, if the number of appearance of a keyword reaches a threshold, before executing step 203, the system may display a prompting message in the user interface of the instant message indicating that it can load the key information of the keyword. A user may confirm that the system can load the key information. The system may then execute step 203. As shown in FIG. 5, the system may display a dialog box. A user may confirm the data loading. The system may then execute step 203. If not, the system may reset the appearance counter and execute step 201. In this embodiment, the system for information matching interacts more with the users to reduce excessive information matching. For example, if the system has already loaded the key information for "the Summer Palace," and "the Summer Palace" later appears again in the chat records, a user may instruct the system not to load the key information for the second time. This saves the data transfer volume of mobile devices, laptops, and other mobile terminals.

In step 204, the system may obtain the key information through the search application interface. After the system starts the search application interface at the backend, the system may obtain the key information through the search application interface. In this embodiment, the key information may include text information, image information, or audio information. Below is an example in which the system for information matching obtains the key information (a street view picture) for a keyword (a name of a place).

In step 204a, the system may look up the coordinates of the place related to the keyword, which is a name of the place. After system parses the name of the place from a chat record, it may look for the coordinates of the place in the keyword database. The keyword database may set the name of the place as an index and the information of the corresponding coordinates as a map array. For example, the map array may be as follows:

$map['Tiananmen Square']=array('x'=>39.916527, 'y'=>116.397128);
$map['Temple of Haven']=array('x'=>39.88098, 'y'=>116.41052000000002);
$map['National Museum']=array('x'=>39.9037, 'y'=>116.39489000000003);
$map['Zhongshan Park']=array('x'=>39.91185, 'y'=>116.39481);
$map['Phoenix Ridge']=array('x'=>40.11175, 'y'=>116.07213999999999);
. . . .

In the above example, "Tiananmen Square," "Temple of Haven" are names of places, which are set to be the indices. x' and y' are the coordinates related to each place.

In step 204b, the system may send the coordinates to a network server through the street view application interface. Once the system obtains the coordinates information, it sends the coordinates to the network server (e.g., a search engine) through the street view application interface.

In step 204c, the system may receive the street view's URL address from the network server. The street view picture is the street view picture corresponding to the proper coordinates looked up by the system. The network server searches for URL of the street view picture based on the coordinates received. The network server may then send the URL to the street view picture to the instant messaging application.

In step 204d, the system may obtain the street view picture form the URL address. The system may download the street view picture at the URL address. Optionally, instead of executing steps 204c and 204d, the network may, after locating the picture, send the street view picture to the instant messaging application directly.

Below is an example in which the system for information matching obtains the key information (definition of a term) for a keyword (technical terminologies).

In step 204a, the system may look up the definitions related to the keyword, which is a technical term. In step 204b, the system may send the definitions to the network server. The network server may look for the URLs to the definitions. In step 204c, the system may receive the technical term definition's URL address from the network server. In step 204d, the system may obtain the definition from the webpage at the URL address.

Figure 6:
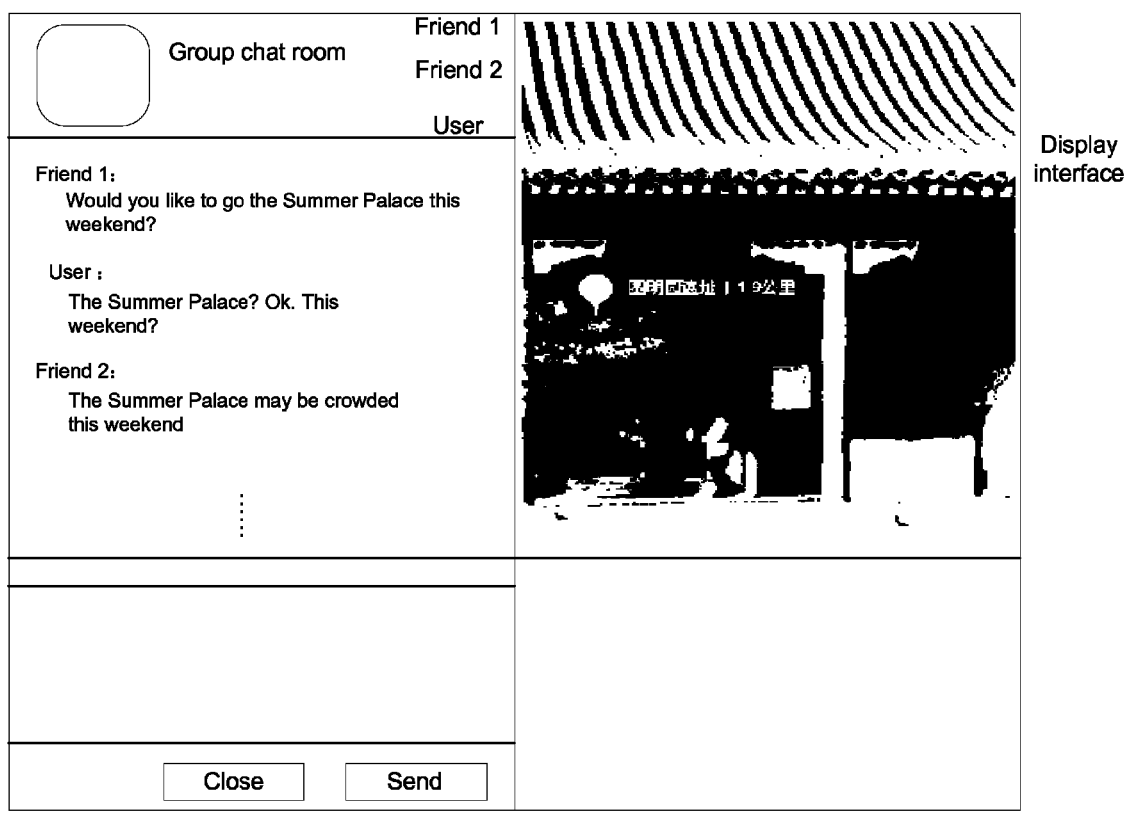
FIG. 6 is an exemplary display interface implemented by an embodiment consistent with the present disclosure.

In step 205, the system may load the key information to the user interface of the instant messaging application. The system for information matching, after receiving the key information, may load the key information into the user interface of the instant messaging application. For example, in FIG. 6, corresponding to the chat record in FIG. 4, the system may create a display interface on the right side of the chat interface. The system may further display the received street view map/picture in the display interface. The users may thus view the street view picture of the keywords without switching out of the instant messaging application.

In this embodiment, the way the system creates a display interface is exemplary. In other embodiments, a display interface may be located on the left side, upper corner, lower corner, etc., of an instant messaging interface. In addition, the system may add another layer of graphics to the instant messaging user interface, such as a translucent layer to display the key information. The system may also use dialog box to show the function icon to the URL of the key information. When a user clicks the function icon or the URL, he may start the webpage or interface to show the key information. Embodiments of the present disclosure are not limited to specific types of displays of the key information.

In this embodiment, the system for information matching analyzes the text of the chat records to identify keywords. In other embodiments, the system may match information based on audio chat records. That is, the system may obtain audio chat records, and use voice recognition applications to convert the audio records into text records, and then execute steps 201-205. The execution of steps 201-205 is described above in relation to FIG. 2, which is not repeated here.

The system for information matching may be implemented on a PC, a network terminal, a mobile phone, or other mobile terminals. The instant messaging application may include, but is not limited to, QQ, WeChat, Fetion, etc. The search engine may include, but is not limited to, a map application including a street view interface (e.g., Google map).

Embodiments of the present disclosure provide a method for information matching. A system for information matching may recognize a name of a place from chat records, and start a street view application interface to obtain a street view picture of the place, and then load the street view picture to the front end instant messaging application user interface. The system for information matching thus enables a user to obtain a street view picture without interrupting an online chat session. The system for information also records the number of appearance for keywords. Once a keyword has appeared a certain number of times, the system may match the keyword with the key information. This reduces the interruptions to the online chat session. Finally, the system may prompt the users before matching the keyword to the key information to allow the user to determine whether to look up the key information. This further reduces the impact of information matching to the chat session.

Below are a few scenarios in which the system for information matching applies the methods consistent with the present disclosure. (1) A user and a friend may use the QQ instant messaging application. The two users may discuss and agree to visit the "Hai Tuo Mountain" together. The system for information matching may start a search application interface and find a landscape picture of the "Hai Tuo Mountain." The system may display the landscape pictures in the QQ interface to the two users. (2) Two users use the QQ Audio instant messaging application. The two friends discuss and agree to meet at a bar. The system may parse the name of the bar from the chat records. The system may start a map application interface to obtain a map of the corresponding location. The system may further display the map in the QQ interface to the two users. (3) Two friends use We Chat to discuss a recommended song. The system may obtain the name of the song from the chat records. The system may start a browser interface to obtain the audio file of the song. The system may play the song to the two users through the WeChat interface. (4) Two users use WeChat audio instant messaging application and discuss the term "LED." The system for information matching may start a browser interface to look up "LED" online. The system may display the search result to the users through the WeChat interface. (5) A traveler uses WeChat instant messaging application and mentions that he is visiting China and would like to try the dish "Kung Pao Chicken." The system for information matching may start a browser interface to look up "Kung Pao Chicken" pictures online. The system may display a picture of the dish to the user through the WeChat interface. (6) Two friends use QQ instant messaging application and discuss that on the day of graduation, they need to dress formally with a tie. The system may obtain the keyword "tie" from the chat records. The system may start a browser interface and search for pictures showing ways to tie a tie. The system may present a picture to the users through the QQ interface. (7) Two friends use QQ instant messaging application and discuss reservations at a hotel. The system may obtain the hotel name from the chat records. The system may start a browser interface and look up links to various travel sites for hotel and flight reservations. The system may display the links to the travel sites through the QQ interface. (8) Two users use QQ instant messaging application and mention that they want to purchase a product. The system may obtain the product name from the chat records. The system may search for price and promotion information related to the product. The system may present the price and promotion information to the user through the QQ interface. (9) Two friends use QQ instant messaging application and mention that one of them uploaded a new journal at a social network site. The system may obtain the user identification and password from that user and obtain the user's home page link from the social website. The system may further display the home page through the QQ interface to the two users.

Figure 7:
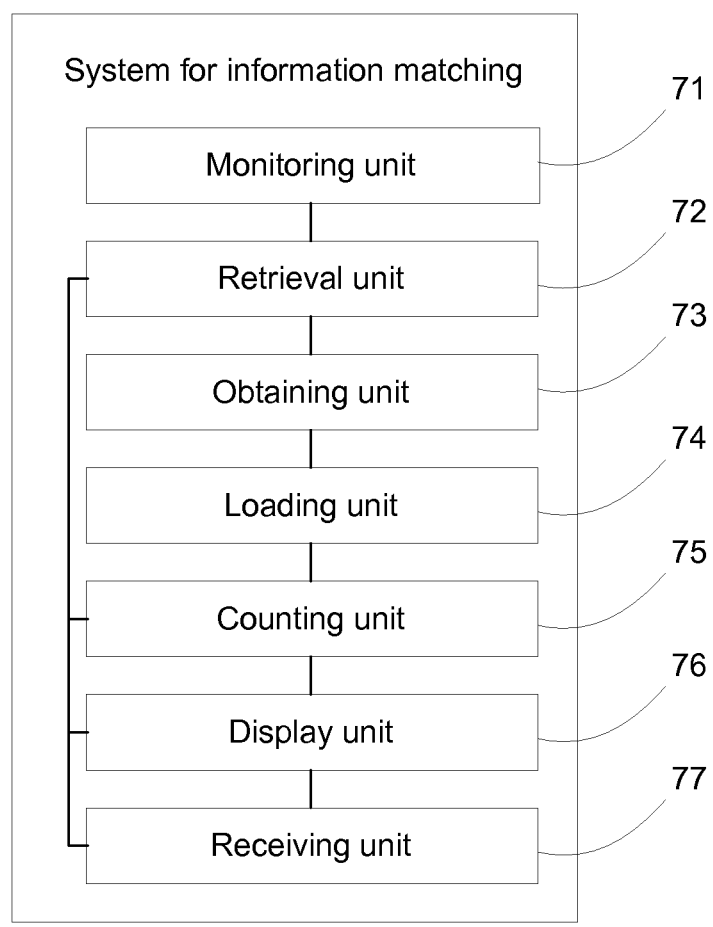
FIG. 7 is a schematic diagram of an exemplary system for information matching consistent with the present disclosure.

In references to FIGS. 1 and 2, embodiments consistent with the present disclosure may provide a system/apparatus for information matching. The system for information matching may be implemented in a PC, a mobile phone, and other electronic devices. As shown in FIG. 7, the system for information matching may include a monitoring unit 71, a retrieval unit 72, an obtaining unit 73, a loading unit 74, a counting unit 75, a display unit 76 and a receiving unit 77.

The monitoring unit 71 may monitor, in real time, the chat records in an instant messaging application. The retrieval unit 72 may call a search application interface once the monitoring unit 71 identifies a keyword. The obtaining unit 73 may obtain the key information related to the keyword once the retrieval unit 72 starts a search application interface. The loading unit 74 may load the key information obtained by the obtaining unit 73 to the instant messaging interface.

Figure 8:
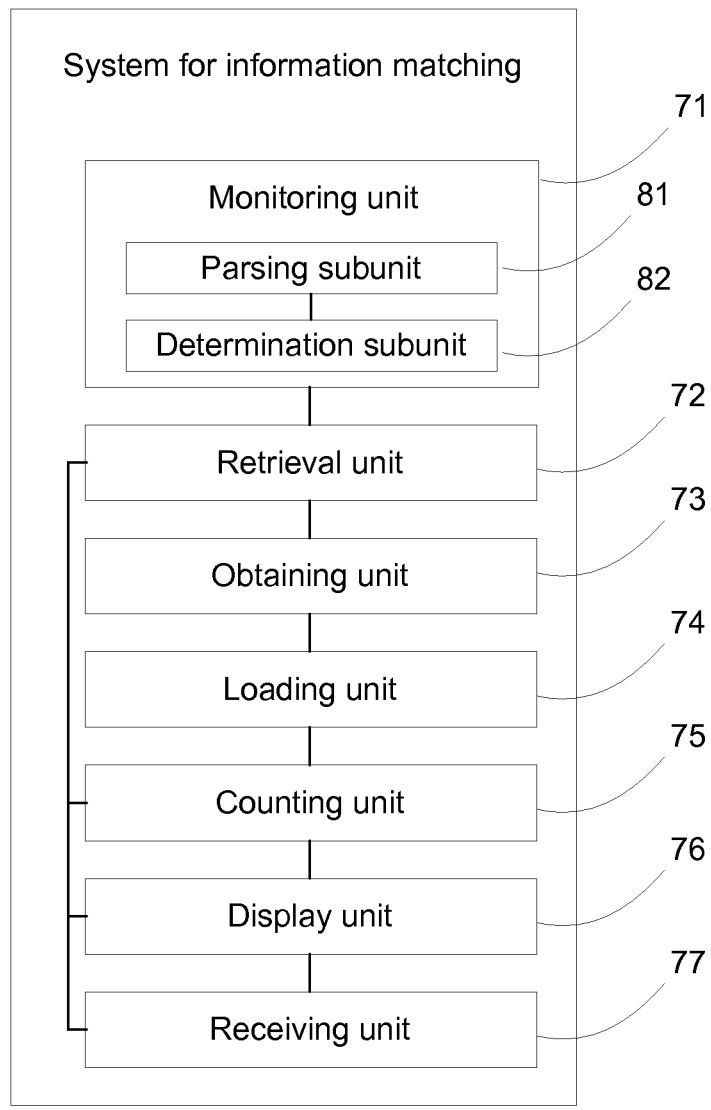
FIG. 8 is another schematic diagram of an exemplary system for information matching consistent with the present disclosure.

Further, as shown in FIG. 8, the monitoring unit 71 may include a parsing subunit 81, a determination subunit 82. The parsing subunit 81 may parse the chat records in an instant messaging session. The determination subunit 82 may determine whether the words parsed out by the parsing subunit 81 includes keywords in the keyword database.

The counting unit 75 may count the appearance of a keyword before the retrieval unit 72 starts a search application interface. The counting unit 75 may increase the number of appearance by 1 for each appearance of a keyword. The retrieval unit 72 may start a search application interface once the number of appearance for the keyword reaches a threshold value, such as 2 or 3. The displaying unit 76 may display a prompting message to the user before the retrieval unit 72 starts the search application to inquire whether the user desires to match the keyword with key information. The receiving unit 77 may receive and confirm instructions from the user. The retrieval unit 72 may start a search application interface once the receiving unit 77 receives a confirmation for loading information.

Figure 9:
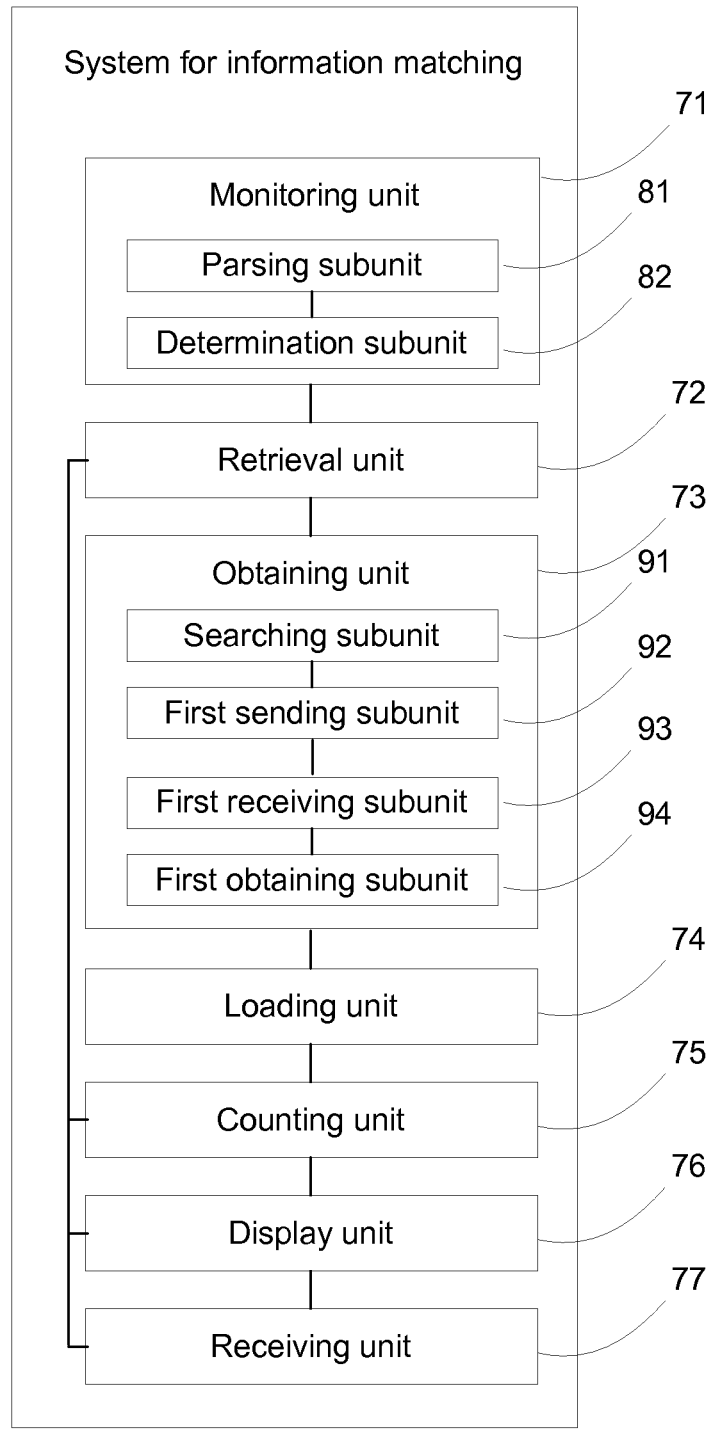
FIG. 9 is another schematic diagram of an exemplary system for information matching consistent with the present disclosure.

As shown in FIG. 9, the obtaining unit 73 may further include a searching subunit 91, a first sending subunit 92, a first receiving subunit 93, and a first obtaining subunit 94. In one example, the monitoring unit 71 may identify a keyword that is a name of a place. The searching subunit 91 may look for the coordinates of the place in the keyword database. The first sending subunit 92 may use a street view application interface to send the coordinates identified by the searching subunit 91 to a network server for information matching. The first receiving subunit 93 may receive the URL to the street view picture from the server. The street view picture may show the street view of the place identified by the keyword. The first obtaining subunit 94 may obtain the street view picture data using the URL received by the first receiving subunit 93.

Figure 10:
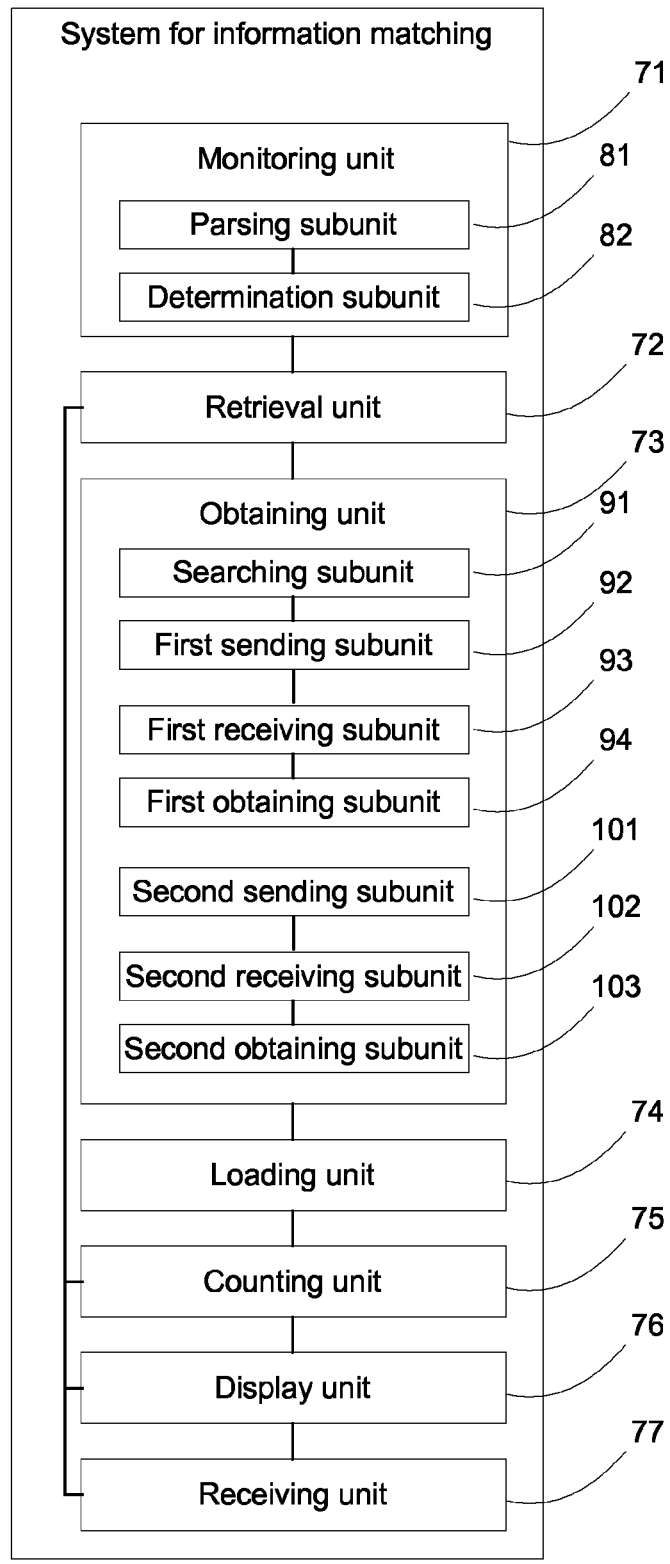
FIG. 10 is another schematic diagram of an exemplary system for information matching consistent with the present disclosure.

In addition, as shown in FIG. 10, the obtaining unit 73 may include a second sending subunit 101 a second receiving subunit 102, and a second obtaining subunit 103. In one example, the monitoring unit 71 may identify a keyword that is a technical term. The second sending subunit 101 may send the keyword to a server through a browser interface. The second receiving subunit 102 may receive a URL from the network server. The URL may link to the search results of the technical term. The second obtaining subunit 103 may obtain a webpage using the URL received by the second receiving subunit 102.

Embodiments consistent with the present disclosure provide a method for information matching. An information matching system consistent with the present disclosure may monitor an instant messaging session in real time. If the system determines that the instant messaging session includes one or more keywords, it may start a search application interface and obtain key information from the interface. The system may further load the key information into the instant messaging user interface to present to the user. An information matching system consistent with the present disclosure may engage a search engine to search the keyword automatically. The system may further load the information relevant to the keyword into the instant messaging user interface to present to the user. Embodiments consistent with the present disclosure may thus reduce the manual exchanges between the instant messaging application and the search application and reduce other user manual operations without affecting the instant messaging session.

Consistent with embodiments of the present disclosure, one or more non-transitory storage medium storing a computer program are provided to implement the system and method for information matching. The one or more non-transitory storage medium may be installed in a computer or provided separately from a computer. A computer may read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed methods and systems, various systems for information matching may be implemented. For example, users in an instant messaging session may share one or more street view pictures or other pictures of interest during an instant messaging session. The users may allow the system to display the pictures associated to keywords automatically or instruct the system to display certain pictures but not the others. In another embodiment, an instant messaging application may turn on the information matching features for certain users but not others. The users with the information matching features turned on may then view key information associated with keywords during instant messaging sessions.

By providing information matching functions and presenting the results seamlessly in an instant messaging interface, the system for information matching provides users with an enriched user experience.

What is claimed is:

1. A method for matching information in an instant messaging user interface, comprising:
    monitoring, in real time, chat records in the instant messaging interface to identify a keyword, including:
        adding to an appearance counter for a keyword for each time the keyword appears in the chat records; and
        when the appearance counter for the keyword reaches a threshold value, determining that the keyword is identified;
    when the keyword is identified, prompting a user in the instant messaging interface about whether to load a key information associated with the keyword;
    when the user gives an instruction to load the key information,
        resetting the appearance counter for the keyword to zero;
        determining a category of the keyword;
        starting a search application interface corresponding to the category of the keyword,
        according to the category of the keyword, obtaining the key information associated with the keyword through the search application interface; and
    presenting the key information in the instant messaging interface;
wherein:
    the category of the keyword includes at least one of: a name of a place, a name of a song, a merchandise, and a technical term; and
    the search application interface includes at least one of: a map application including a street view application interface, and a browser interface, wherein the map application corresponds to the name of the place, and wherein the browser interface corresponds to the name of the song, the merchandise, and the technical term.

2. The method according to claim 1, wherein monitoring chat records in real time further comprises:
    parsing a chat record; and
    determining whether a parsed word is a keyword.

3. The method according to claim 1, wherein the keyword is a name of a place.

4. The method according to claim 3, the method further comprising:
    searching for coordinates corresponding to the keyword in a keyword database;
    starting a street view application interface;
    sending the coordinates to a server through the street view application interface;
    receiving, from the server, a URL to a street view picture corresponding to the coordinates sent; and
    presenting the street view picture in the instant messaging interface.

5. The method according to claim 1, wherein the keyword is a technical term.

6. The method according to claim 5, the method further comprising:
    searching for a definition of the keyword through a browser interface;
    sending the definition to a server;
    receiving, from the server, a URL to a webpage providing definitions or explanations of the keyword; and
    presenting the URL in the instant messaging interface.

7. The method according to claim 1, further comprising:
    when the appearance count for the keyword does not reach the threshold value in a preset time period, resetting the appearance counter for the keyword to zero.

8. The method according to claim 1, wherein:
    when the keyword is a name of a song, the key information associated with the keyword includes an audio file of the song obtained through the browser interface.

9. The method according to claim 1, wherein:
    when the keyword is a merchandise, the key information associated with the keyword includes at least one of a price information, a reservation information, and a promotion information related to the merchandise obtained through the browser interface.

10. A system for matching information in an instant messaging user interface, the system including at least one processor, the system comprising:
    a monitoring unit configured to monitor, in real time, chat records in the instant messaging interface to identify a keyword;
    a counting unit configured to add to an appearance counter for a keyword for each time the keyword appears in the chat record,
        wherein when the appearance counter reaches a threshold value, the keyword is identified;
    a retrieval unit configured to start a search application interface corresponding to a category of the keyword if the keyword is identified, wherein the category of the keyword includes at least one of: a name of a place, a name of a song, a merchandise, and a technical term;

an obtaining unit configured to obtain a key information associated with the keyword through the search application interface according to the category of the keyword; and a display unit configure to present the key information in the instant messaging interface;

wherein:

before the retrieval unit starts the search application, the display unit is further configured to prompt a user in the instant messaging interface to inquire whether to load the key information associated with the keyword;

when the user gives an instruction to load the key information, the counting unit is further configured to reset the appearance counter for the keyword to zero; and the search application interface includes at least one of:

a map application including a street view application interface, and a browser interface, wherein the map application corresponds to the name of the place, and wherein the browser interface corresponds to the name of the song, the merchandise, and the technical term.

11. The system according to claim 10, the monitoring unit further comprising:

a parsing subunit configured to parse a chat record; and a determination subunit configured to determine whether a parsed word is a keyword.

12. The system according to claim 10, wherein the keyword is a name of a place.

13. The system according to claim 12, the obtaining unit further comprising:

a searching subunit configured to search for coordinates corresponding to the keyword in a keyword database;

a first sending subunit configure to start a street view application interface and send the coordinates to a server through the street view application interface;

a first receiving subunit configured to receive a URL to a street view picture corresponding to the coordinates; and a first obtaining subunit configured to obtain the street view picture using the URL.

14. The system according to claim 10, wherein the keyword is a technical term.

15. The system according to claim 14, the obtaining unit further comprising:

a searching subunit configured to search for a definition of the keyword through a browser interface;

a second sending subunit configured to send a definition of the keyword to a server;

a second receiving subunit configured to receive, from a server, a URL to a webpage providing definition and explanations of the keyword; and a second obtaining subunit configured to obtain the definitions and explanations from the webpage linked to the URL.

16. A non-transitory computer-readable medium having computer program for, when being executed by a processor, performing a method for matching information in an instant messaging user interface, the method comprising:

monitoring, in real time, chat records in the instant messaging interface to identify a keyword;

starting a search application interface corresponding to a category of the keyword if the keyword is identified;

according to the category of the keyword, obtaining key information associated with the keyword through the search application interface; and presenting the key information in the instant messaging interface, wherein monitoring chat records in real time further includes parsing a chat record; and determining whether a parsed word is a keyword, wherein the method further includes:

adding to an appearance counter for a keyword for each time the keyword appears in the chat record;

starting the search application interface if the appearance counter for the keyword reaches a threshold value; and resetting the appearance counter for the keyword to zero when the search application interface is started;

and wherein:

the category of the keyword includes at least one of: a name of a place, a name of a song, a merchandise, and a technical term; and the search application interface includes at least one of: a map application including a street view application interface, and a browser interface, wherein the map application corresponds to the name of the place, and wherein the browser interface corresponds to the name of the song, the merchandise, and the technical term.

17. The non-transitory computer-readable medium according to claim 16, the method further comprising:

prompting a user in the instant messaging interface about loading the key information; and retrieving the key information if the user gives an instruction to load the key information.

18. The non-transitory computer-readable medium according to claim 17, wherein the keyword is a name of a place and the method further includes:

searching for coordinates corresponding to the keyword in a keyword database;

starting a street view application interface;

sending the coordinates to a server through the street view application interface;

receiving, from the server, a URL to a street view picture corresponding to the coordinates sent; and presenting the street view picture in the instant messaging interface.

* * * * *